(12) United States Patent  
Jackson, III

(10) Patent No.: US 7,947,899 B2
(45) Date of Patent: May 24, 2011

(54) ENHANCED POLE GUARDS FOR ELECTRIC UTILITY POLES

(76) Inventor: Denton L. Jackson, III, Coldwater, MS (US)

( * ) Notice: Subject to any disclaimer, the term of this patent is extended or adjusted under 35 U.S.C. 154(b) by 530 days.

(21) Appl. No.: 12/069,177

(22) Filed: Feb. 6, 2008

(65) Prior Publication Data

US 2008/0296059 A1  Dec. 4, 2008

Related U.S. Application Data

(60) Provisional application No. 60/899,980, filed on Feb. 6, 2007.

(51) Int. Cl.
*H02G 1/02* (2006.01)
(52) U.S. Cl. ............... 174/5 SB; 174/5 SG; 174/138 F; 174/5 R

(58) Field of Classification Search .................. 174/5 R, 174/5 SB, 5 SG, 136, 138 F, 139, 138 R; 52/101; 248/71
See application file for complete search history.

(56) References Cited

U.S. PATENT DOCUMENTS 4,223,491 A * 9/1980 Vaughn ........................... 52/147
4,845,307 A * 7/1989 Cumming et al. ............ 174/5 R

* cited by examiner

*Primary Examiner* — Dhiru R Patel
(74) *Attorney, Agent, or Firm* — Fantastic IP Consulting, LLC

(57) ABSTRACT

A novel pole guard for electric utility poles has at least one notch for allowing a portion of the pole guard to provide insulative coverage below a cross arm of a utility pole. Further features include hooks, pins, or other fasteners on the pole guard for attaching insulative blankets.

9 Claims, 8 Drawing Sheets

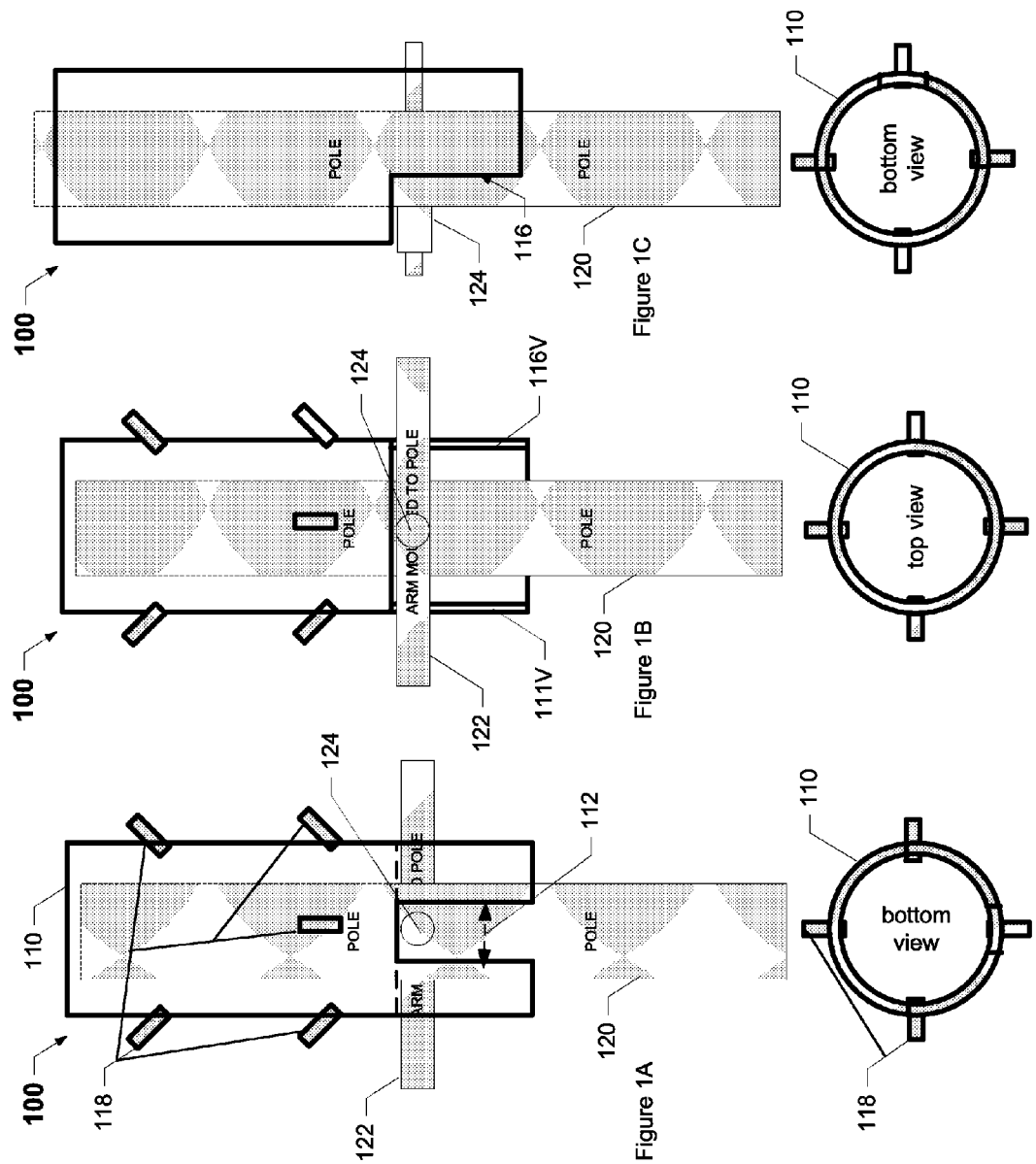

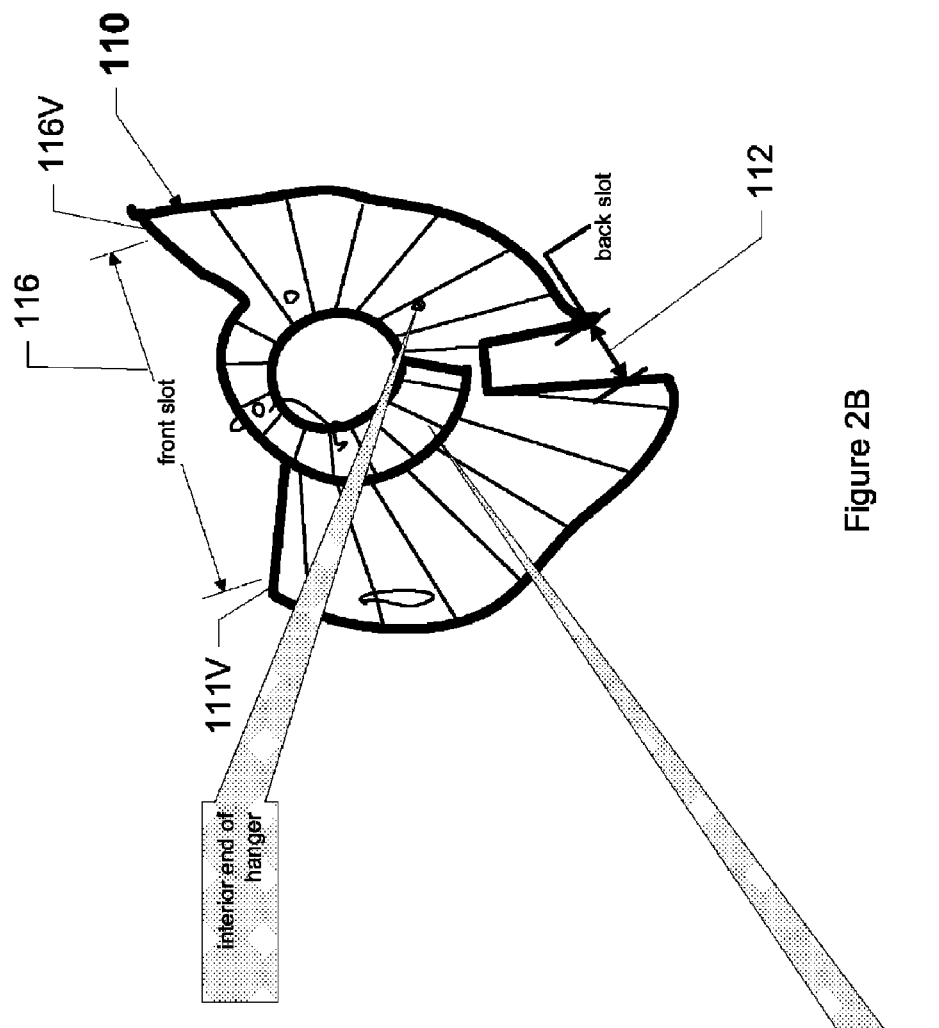
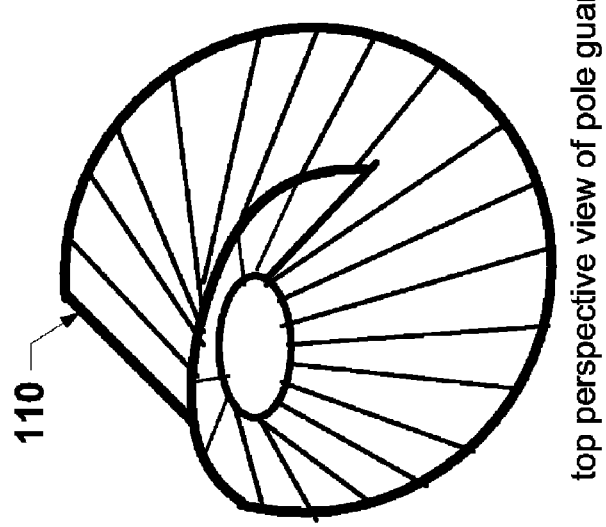
Figure 2A
Figure 2B plan view of flattened insulative sheet showing layout out of slots, etc.

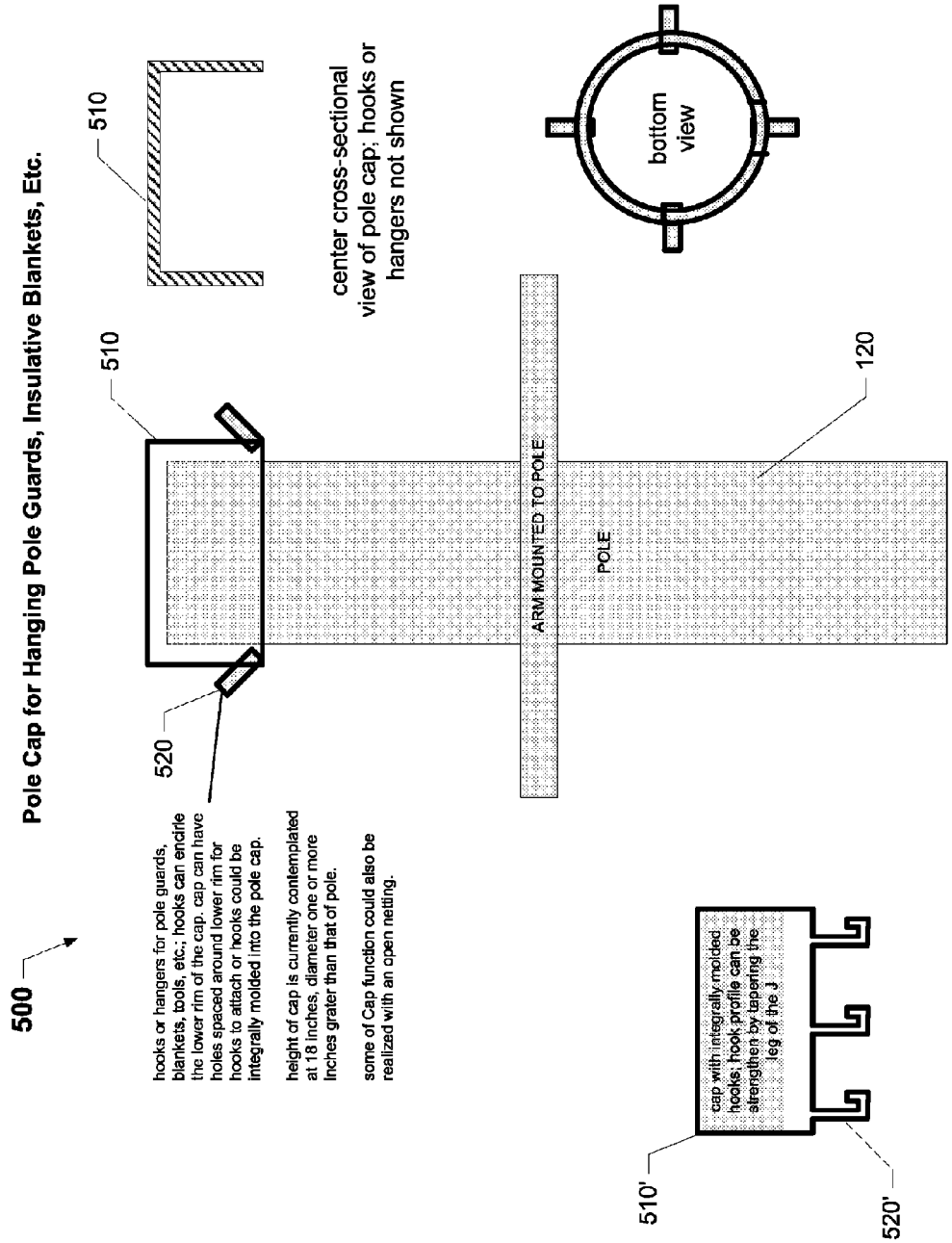

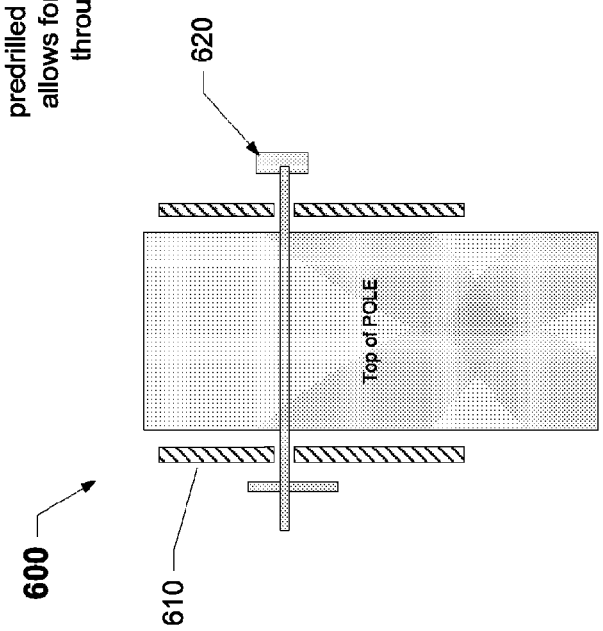

Figure 6

Pole Cap: alternative embodiment is a cylinder (or rolled sheet) with one or more slats or straps or pin across the top. Pin can serve as canting reference when setting pole, and can be integrated with light, for example laser pointer. Light may also be fastened at any point on the pole cap. Note that hooks (i.e. exemplary blanket attachment means, not shown in this view.

note most poles are predrilled at the top, which allows for insertion of pin through the pole.

note that to allow for adjusting fit of the pole cap around the pole, one or both pin holes in the pole cap can be replaced with a horizontal slot, e.g., 3in. by 1 in. The slot can be covered with a resilient insulative material, such as rubber, having a smaller horizontal slot to allow for "cinching" of rolled pole guard around the pole while still maintaining alignment with pin hole on other side of pole cap.

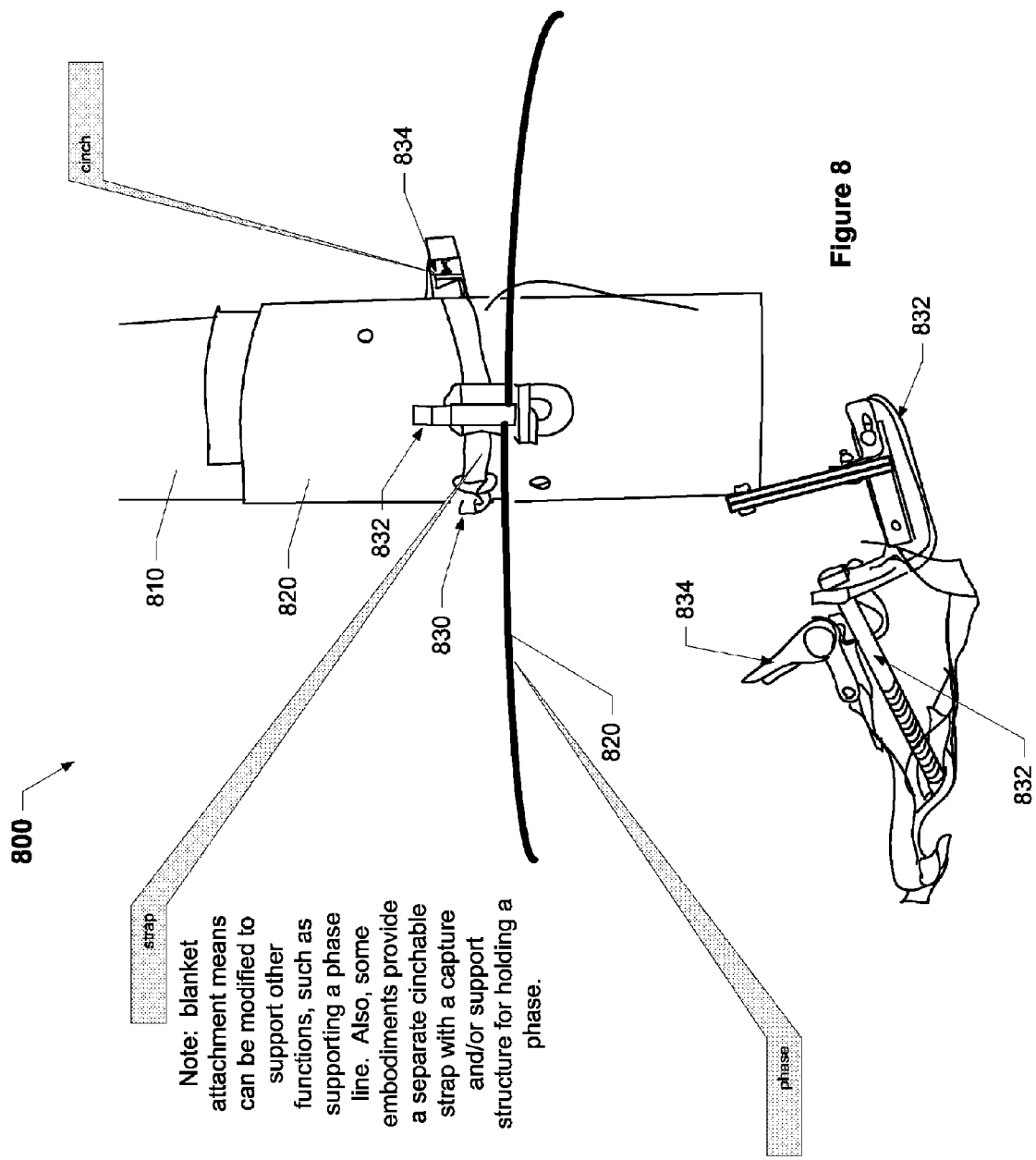

ENHANCED POLE GUARDS FOR ELECTRIC UTILITY POLES

RELATED APPLICATION

The present application claims priority to U.S. Provisional Patent Application 60/899,980, which was filed on Feb. 6, 2007. This application is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2006, Denton L. Jackson.

BACKGROUND

Electricity is critical to our modern way of life. A critical component in the systems that distribute electricity from electrical generating stations to our homes and businesses are the utility poles that support the power lines carrying the electricity. Equally critical to the operation of these electrical distribution systems is the work of thousands of electrical lineman across the world who daily face the risk of electrocution while installing, maintaining, and reconnecting power lines and related distribution equipment.

Understanding the risk of electrocution and other life-threatening injuries in working on and around electrical utility poles, lineman take safety seriously. One common measure taken to promote safety is wrapping a portion of the utility pole above the cross arm that supports the power lines in an insulative sleeve known as a pole guard to prevent a lineman from inadvertently contacting an electrified (hot) portion of the power line or pole. Conventional pole guards consist of a rolled rectangular sheet of insulation. The rolled sheet, often formed of fiberglass or plastic, forms a tube, which can be manually uncoiled and placed around an upper portion of the utility pole, with the base of the tube resting atop the crossarm. A further measure is to lay insulative blankets on the cross-arms and secure them to the pole guard and/or pole using adhesive tape.

The present inventor, a lineman for many years, has recognized at least two problems with usage of conventional pole guards. First, conventional pole guards offer no "cover up," that is protection, below the crossarm of a utility pole even though in many situations, such as in working on concrete or metal poles, the risk of contacting an electrified surface is significant. Second, using conventional pole guards with insulative blankets entails use of cumbersome and time consuming taping techniques. Applying the tape can cause back strain or lead to inadvertent dropping or detachment of blankets.

Accordingly, the present inventor has recognized a need for better pole guards for electric utility poles.

BRIEF DESCRIPTION OF DRAWINGS

FIG. 1A is a back view of an exemplary pole guard assembly corresponding to one or more embodiments of the present invention.

FIG. 1B is a front view of the exemplary pole guard assembly in FIG. 1A

FIG. 1C is a side view of the exemplary pole guard assembly in FIGS. 1A and 1B.

FIGS. 2A and 2B are top and bottom perspective views of the interior of an exemplary pole guard corresponding to one or more embodiments of the present invention.

FIG. 5 is a front view of an alternative pole guard (pole cap) corresponding to one or more embodiments of the present invention.

FIG. 6 is a front view of an alternative pole guard (pole cap) corresponding to one or more embodiments of the present invention.

FIG. 8 is a black and white photo of an exemplary phase holding device which corresponds to one or more embodiments of the present invention.

DETAILED DESCRIPTION

This description describes one or more specific embodiments of one or more inventions. These embodiments, offered not to limit but only to exemplify and teach the invention, are shown and described in sufficient detail to enable those skilled in the art to implement or practice the invention. Thus, where appropriate to avoid obscuring the invention(s), the description may omit certain information known to or ascertainable without undue experimentation by those of skill in the art.

FIG. 1A is a back view of an exemplary pole guard assembly corresponding to one or more embodiments of the present invention.

FIG. 1B is a front view of the exemplary pole guard assembly in FIG. 1A

FIG. 1C is a side view of the exemplary pole guard assembly in FIGS. 1A and 1B.

FIGS. 2A and 2B are top and bottom perspective views of the interior of an exemplary pole guard corresponding to one or more embodiments of the present invention.

Figure 3:
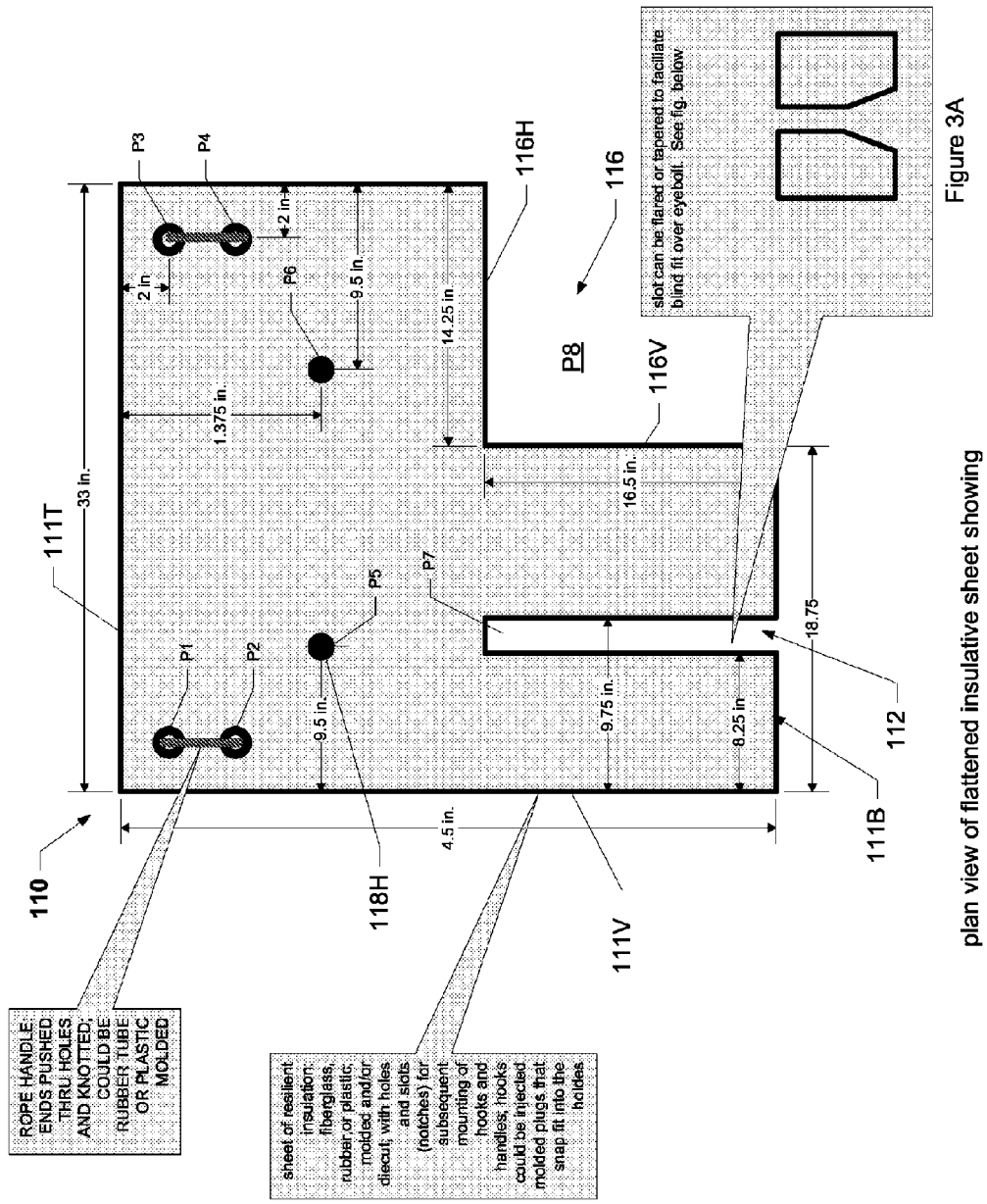
FIG. 3 is a plan view of an unrolled mode of the pole guard in FIGS. 1A-1C, and therefore corresponds to one or more embodiments of the invention.

FIG. 3 is a plan view of an unrolled mode of the pole guard in FIGS. 1A-1C, and therefore corresponds to one or more embodiments of the invention.

Figure 4:
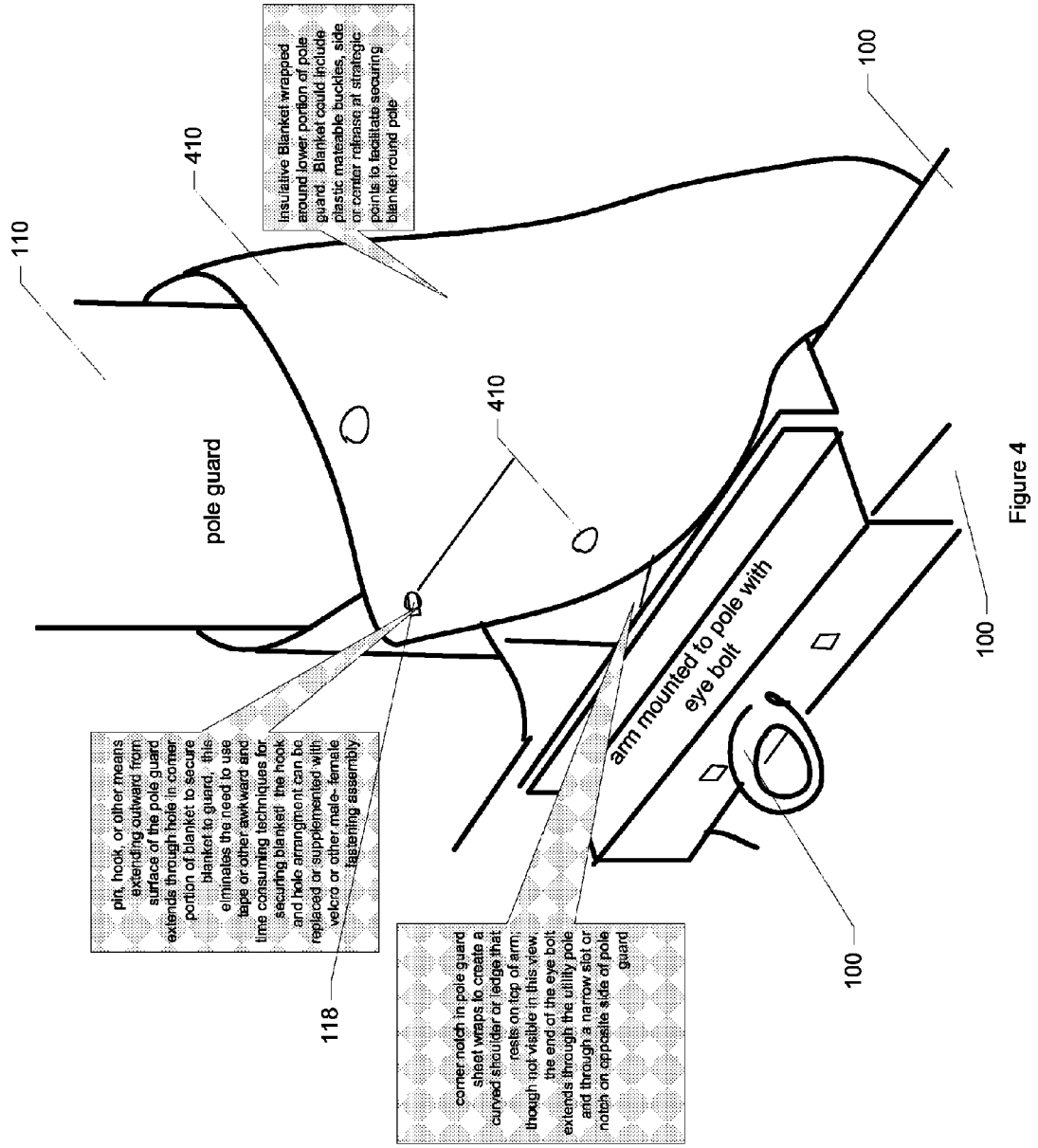
FIG. 4 is a perspective view (black and white photo) of a pole guard and blanket assembly corresponding to one or more embodiments of the present invention.

FIG. 4 is a perspective view (black and white photo) of a pole guard and blanket assembly corresponding to one or more embodiments of the present invention.

Pole guard assembly 100 includes a electrically insulative tube-like structure 110 which is configured for an electric utility pole 120 having a transverse arm structure 122 mounted to one side of the pole using a bolt 124 that extends through the arm structure 122 to the opposite side of the pole. The electrically insulative tube-like structure 110, which consists essentially of fiberglass and defines a pole guard, encircles or surrounds a section of pole 120 above the arm structure and includes: a first vertical slot 112 configured to fit over an end of bolt 124 on the other side of the pole; and a second vertical slot 116 configured for resting above or in contact with transverse arm structure 122. One or more of the vertical slots engage portions of the pole, such as the cross arm or the through bolt, and thereby inhibit rotation of the pole guard relative to the pole.

FIGS. 2A, 2B, and 3 show that in the exemplary embodiment, tube-like structure 110 comprises a rolled sheet of insulative material, such as fiberglass, the sheet having a top edge 111T and a bottom edge 111B, with the bottom edge including vertical slot 112 and a corner notch 116 defined by a generally vertical edge portion 116V and a generally horizontal edge portion 116H that intersect. Vertical slot 112 has a height measured from a bottom edge 111B of the rolled sheet in a dimension generally parallel to the pole that is substantially the same as that of the generally vertical edge portion 116V of the corner notch.

In the exemplary embodiment, the tube like structure also includes pins 118. FIG. 4 shows that one of pins 118 being used to removably attach an insulative blanket 410 blanket 410 in a coiled and generally fixed position relative to the tube-like structure (pole guard) 110.

The vertical slot positioned between the first vertical edge and a vertical edge of the corner notch, wherein the vertical edge 116V of the corner notch and a portion of the first vertical edge 111V cooperate to define another vertical notch 116 when the sheet is rolled around a pole. The width of the vertical notch 116 (between vertical edges 111V and 116V, shown best in FIGS. 1B and 2B) is variable depending on how tightly the sheet is rolled around a pole. Tube like structure 110 is formed by diecutting a sheet of fiberglass material to include the vertical slot and the corner notch or by molding an insulative material to including the vertical slot and the corner notch.

FIG. 5 is a front view of an alternative pole guard (pole cap) corresponding to one or more embodiments of the present invention.

FIG. 6 is a front view of an alternative pole guard (pole cap) corresponding to one or more embodiments of the present invention.

Figure 7:
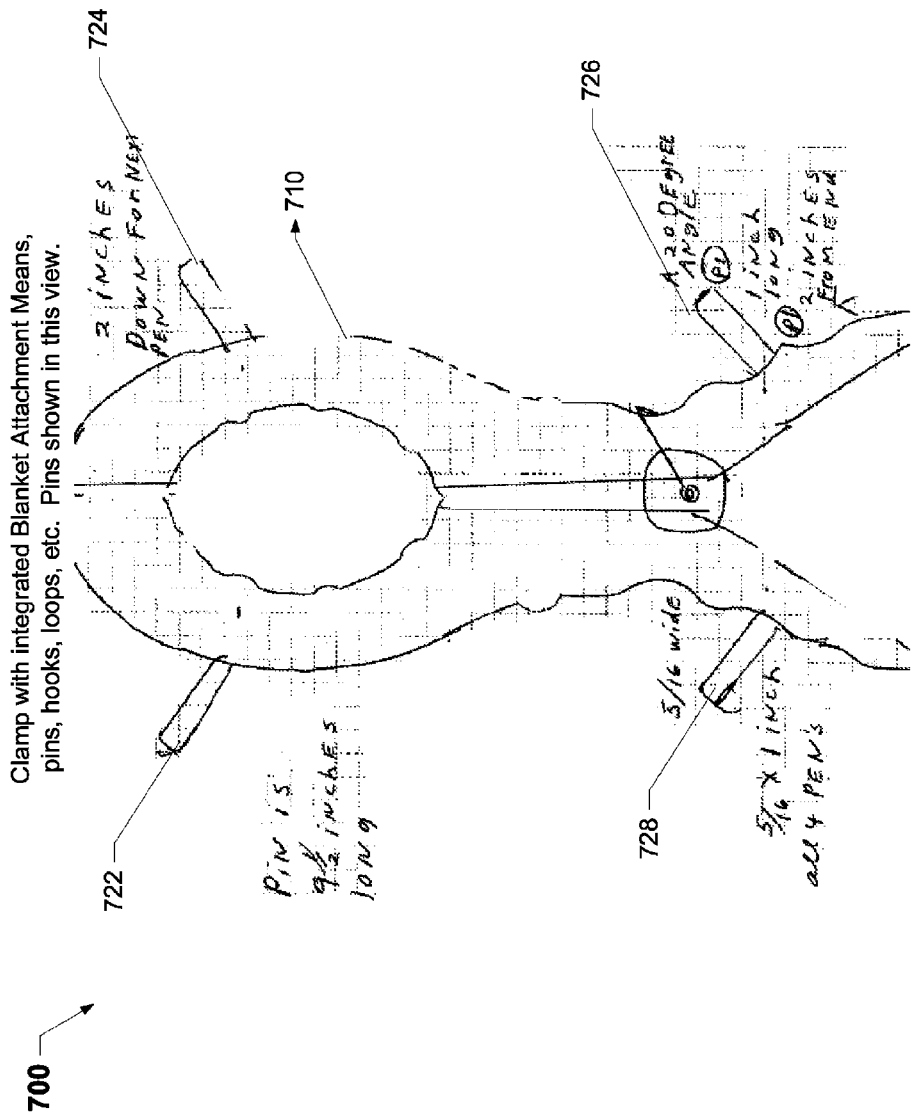
FIG. 7 is a top view of an insulative clamp with integrated blanket pins or hooks, which corresponds to one or more embodiments of the present invention. (Blankets not shown in this view; multiple clamps can be attached to insulators to facilitate attachment of blankets.)

FIG. 7 is a top view of an insulative clamp with integrated blanket pins or hooks, which corresponds to one or more embodiments of the present invention. (Blankets not shown in this view; multiple clamps can be attached to insulators to facilitate attachment of blankets.)

FIG. 8 is a black and white photo of an exemplary phase holding device which corresponds to one or more embodiments of the present invention.

CONCLUSION

The embodiments described and/or illustrated herein are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

What is claimed is:

1. A pole guard configured for an electric utility pole having a transverse arm structure mounted to one side of the pole using a bolt that extends through the arm structure to the opposite side of the pole, the guard comprising:
   an electrically insulative tube-like structure means for encircling or surrounding a section of the pole above the arm structure, the means including:
      a first vertical slot configured to fit over an end of the bolt on the opposite side of the pole; and
      a second vertical slot positioned opposite the first vertical slot and having a top edge portion configured to rest on top of the transverse arm structure.

2. The pole guard of claim 1, wherein the tube-like structure comprises a rolled sheet of insulative material, the sheet having a top edge and a bottom edge, with the bottom edge including the first vertical slot and a corner notch defined by a generally vertical edge portion and a generally horizontal edge portion that intersect.

3. The pole guard of claim 2, wherein the first vertical slot has a height measured from the bottom edge of the rolled sheet in a dimension generally parallel to the pole that is substantially the same as that of the generally vertical edge portion of the corner notch.

4. The pole guard of claim 1, further comprising second means for holding at least a portion of an insulative blanket in a generally fixed position relative to the pole guard.

5. The pole guard of claim 1, wherein one or more of the vertical slots inhibit rotation of the pole guard relative to the pole.

6. A pole guard comprising:
   an electrically insulative sheet of material suitable for rolling around a utility pole, the insulative sheet having a first vertical slot and a corner notch;
   wherein the insulative sheet includes a first vertical edge, with the first vertical slot positioned between the first vertical edge and a vertical edge of the corner notch, wherein the vertical edge of the corner notch and a portion of the first vertical edge cooperate to define a second vertical slot.

7. The pole guard of claim 6, wherein the second vertical slot has a variable width depending on how tightly the sheet is rolled around the pole.

8. The pole guard of claim 6, wherein the electrically insulative sheet consists essentially of fiberglass.

9. The pole guard of claim 6, further comprising means for removably attaching an insulative blanket to a surface of the pole guard.

\* \* \* \* \*